Figure 1:
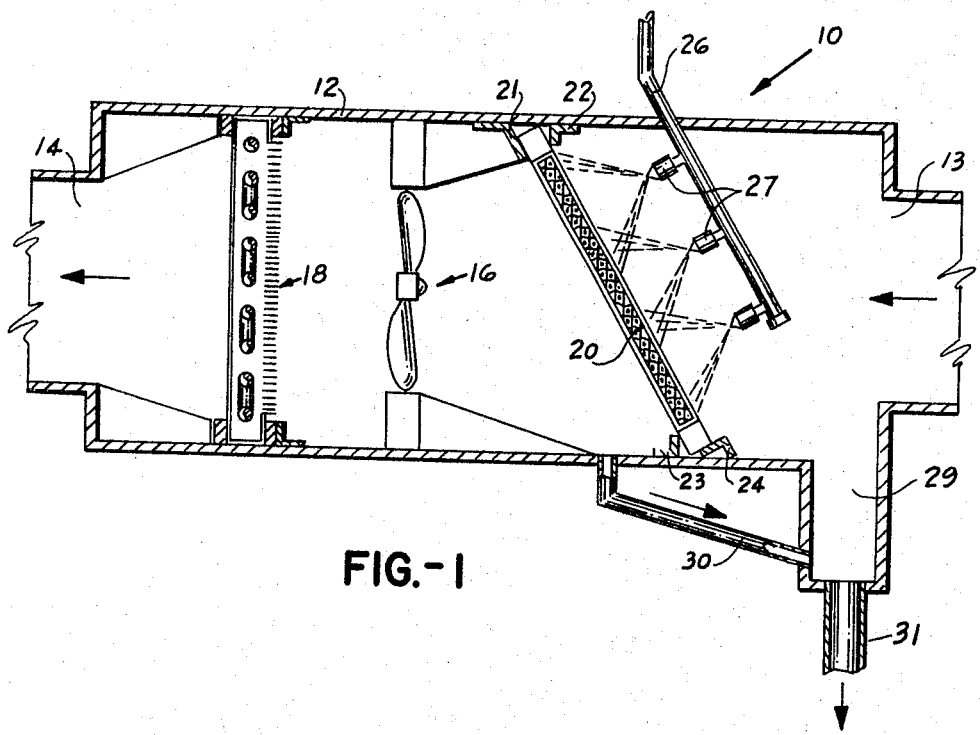

INVENTOR.
ROBERT H. ILLINGWORTH
BY
MORGAN, FINNEGAN, DURHAM & PINE
ATTORNEYS

United States Patent Office 3,325,973
Patented June 20, 1967

3,325,973
AIR PURIFICATION
Robert H. Illingworth, Loantaka Lane, N.J., assignor to
The Evening News Publishing Company, Newark, N.J.,
a corporation of New Jersey
Filed June 8, 1964, Ser. No. 373,178
14 Claims. (Cl. 55—90)

This invention relates generally to air purification and more particularly to new and useful means and procedures for removing undesirable foreign material entrained in air.

Although generally applicable whenever it is desired to purify air, this invention is principally directed to the removal of entrained foreign matter from the air in newspaper printing rooms and similar environments.

In newspaper and other similar printing rooms, large amounts of ink, lint, and related particles, collectively referred to in the industry as "floc," are entrained in the air. Unless removed, the floc content rapidly builds up to a level which constitutes a serious health hazard to operating personnel. A high floc content in the air also adversely affects and hampers normal printing operations.

Heretofore, it has been customary to use a "fast air change" to prevent build-up of floc in the air, i.e., fresh air is continuously sucked into the printing room and foul air continuously exhausted to the atmosphere. This procedure is disadvantageous for several reasons. It requires large blowers and extensive ducting systems. Because of the high content of ink and lint, exhaust of the foul air to the atmosphere creates serious air pollution problems. In addition, with "fast air change," the relative humidity of the air in the printing room tends to remain low. In low relative humidity environments, static electricity on the paper being printed tends to build up. Static electricity causes the paper, when passing over the metal rollers, to be attracted to the rollers, resulting in the paper sagging and "dancing" between the rollers, thereby hampering efficient operation.

It has also been proposed heretofore to remove floc from the air in printing rooms by filtration. A variety of filtration means have been suggested whose purpose is to eliminate the foreign matter from the air. Such filtration means employ filtering elements such as screens, liquid baths, sprays, and the like. Conventional filtering means of the type heretofore employed however require periodic replacements of the filter elements, which become inactive due to clogging by the floc.

The present invention has as its principal object to remove the floc from environments of the type described.

Another object of this invention is to remove the floc from environments of the type described by a filtering operation, while simultaneously eliminating the need for periodic replacement of the filtering element.

According to this invention, there is provided a method whereby air is purified by scrubbing with an aqueous solution of a non-ionic wetting agent.

According to a preferred embodiment of the invention, a method is provided whereby air is purified by filtration, the method being characterized by the fact that the filtering elements are rendered self cleaning and maintained on stream in good operating condition over long periods of time.

The present invention is further characterized by a novel air purifying medium consisting of an aqueous solution of a non-ionic wetting agent. The aqueous solution is used to scrub the air to be purified, thereby removing the entrained foreign matter.

In a preferred embodiment, the aqueous solution of non-ionic wetting agent is uniformly distributed over the surface of a filtering element, e.g., a metal screen, which is mounted in the path of and transversely to the direction of flow of the air stream to be purified. As the air flows through the filter element, the suspended foreign matter is entrapped by the element. The aqueous solution of non-ionic wetting agent continuously flows over and continuously wets the filtering element and efficiently scrubs therefrom the entrapped foreign matter, thereby maintaining the filtering surfaces of the element free of foreign material. The purified air after scrubbing or scrubbing and filtration in the manner described may be recycled to the printing room or exhausted to the atmosphere.

It will be understood that the foregoing general description and the following detailed description as well are exemplary and explanatory of the invention but are not restrictive thereof. Thus, while the air purification means of this invention is particularly adapted to and was designed for use in purifying the air of printing press rooms, the principles underlying the operation of the invention are not limited to such usage, but are generally applicable to air purification systems, including air conditioning systems. For example, temperature and humidity of the air being treated according to this invention may be regulated by regulating the temperature and rate of flow of the aqueous solution, contacting the air to be purified.

Since the invention is particularly directed to eliminating the problems associated with floc normally entrained in the air of printing press rooms, reference will be made hereinafter to such use in order to provide an example of a practical and useful embodiment of the invention.

The accompanying drawings, referred to herein and constituting a part hereof, illustrate one embodiment of the invention, and together with the description, serve to explain the principles of the invention.

Figure 2:
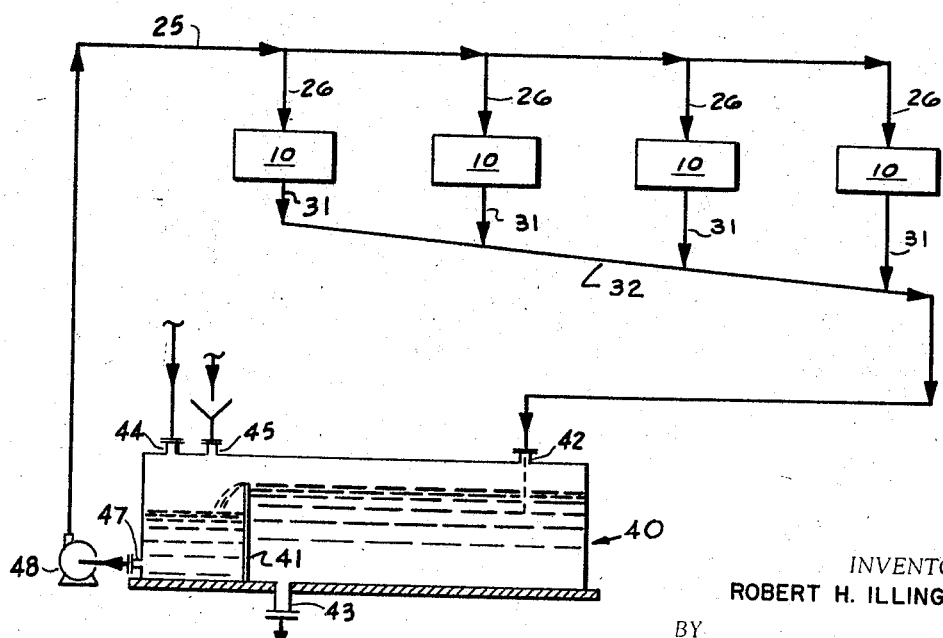

Of the drawings:

FIGURE 1 is a longitudinal sectional and partial elevational view of an air purifying unit embodying the present invention; and FIGURE 2 is a schematic flow diagram representing an air purification system in accordance with the present invention.

The non-ionic surface active agent suitable for use in this invention is preferably water soluble.

The most typical representatives of non-ionic wetting agents suitable for use herein are the oxyalkylated surfactants or more specifically polyalkylene ethers or polyoxyalkylene surfactants. The methods employed to prepare such oxyalkylated surfactants are well known. Most of these surfactants contain, in at least one place in the molecule and often in several places, an alkanol or a polyglycolether chain. These are most commonly derived by reacting a starting molecule, possessing one or more oxyalkylatable reactive groups, with an alkylene oxide such as ethylene oxide, propylene oxide, butylene oxide, or higher oxides, epichlorohydrin, etc. However, they may be obtained by other methods such as shown in U.S. Patents 2,588,771 and 2,596,091-3, or by esterification or amidification with an oxyalkylated material, etc. Mixtures of oxides or successive additions of the same or different oxides may be employed. Any oxyalkylated material may be employed. As typical starting materials may be mentioned alkyl phenols, phenolic resins, alcohols, glycols, amines, organic acids, carbohydrates, mercaptans, and partial esters of polybasic acids. In general, the art teaches that, if the starting material is water-soluble, it may be converted into an oil-soluble surfactant by the addition of polypropoxy or polybutoxy chains. If the starting material is oil-soluble, it may be converted into a water-soluble surfactant by the addition of polyethoxy chains. Subsequent additions of ethoxy units to the chains tend to increase the water solubility, while subsequent additions of higher alkoxy chains tend to increase the oil solubility. In general, the final solubility and surfactant properties are a result of a balance between the oil-soluble and water-soluble portions of the molecule. Since the solutions of the present invention are water-soluble, the oxyalkylated surfactant employed herein should be water-soluble also.

The non-ionic surfactants preferred for use may be described as water soluble synthetic non-ionic surface active agents containing a polyoxyalkylene chain of at least two alkenoxy groups, and derived from alkyl phenolic compounds in which the total number of alkyl carbon atoms is between 4 and 24.

Non-ionic surface active agents particularly suitable for carrying out the instant invention may be more specifically represented by the general formula $$R-(-CHR^1-CHR^1-O-)_n-H$$

wherein R represents the residue of a suitable alkyl phenol, $R^1$ represents hydrogen or lower alkyl, and $n$ has a value from 2 to 100 or more and usually from about 4 to 30. It will be appreciated that $n$ corresponds to the number of alkenoxy groups, e.g., ethylene oxide, per molecule of the composition. Compounds of this type are well known in the art. In general, they may be obtained by condensing a polyglycol ether containing the required number of alkenoxy groups or an alkylene oxide such as propylene oxide, butylene oxide, or preferably ethylene oxide, with a suitable alkyl phenol. The amount of alkylene oxide condensed with the alkyl phenol, i.e., the length of the polyoxyalkylene chain, will depend primarily upon the particular compound with which it is condensed. As a convenient rule of thumb, approximately 1 mole of alkylene oxide should be employed for each two carbon atoms in the alkyl phenol. However, the optimum amount of alkylene oxide may readily be determined in any particular case by preliminary test and routine experimentation.

Especially good air purification is achieved when the non-ionic surfactant is either an ethylene oxide adduct of dodecyl phenol having a formula corresponding to that indicated above, wherein $n$ is between about 8 and 15, or a condensation product of nonyl-phenol and ethylene oxide having the structural formula

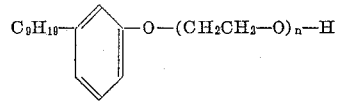

wherein $n$ is an integer between 8 and 15. Such non-ionic surfactants constitute highly preferred species for use herein.

A small, effective amount of non-ionic wetting agent will be employed in the aqueous solution used to scrub the air and/or to continuously wet the filter element. In general, the aqueous solution will contain less than 1 percent and generally less than 0.5 percent by weight of the non-ionic wetting agent. Especially good results are obtained with aqueous solutions containing between about 0.005 and 0.25 percent by weight of non-ionic wetting agent, and such solutions are preferred.

Commercially available non-ionic wetting agents which may be used in the practice of this invention are described in Schwartz & Perry, Surface Active Agents, vol. 1, Interscience Publication, New York, pp. 202-213, which reference is incorporated herein by reference.

If desired, a small effective amount of an anti-foaming agent may be utilized in the aqueous solution of the non-ionic wetting agent. Typical anti-foaming agents include the water soluble type, such as glyceride oils and fatty acids; and the water insoluble type, such as octyl alcohols, cyclohexanol, lauryl and cetyl alcohol, 1,2 and 1,3 glycols, water insoluble esters of phosphoric acid, and vegetable oils, such as castor oil, ethyl oleate and the like.

Generally, the water soluble type of anti-foaming agent will be used merely as a carrier for the water insoluble type.

Referring now more particularly to the drawings, there is illustrated in FIGURE 1 an air purification unit 10 comprising a housing 12 formed of sheet metal or other suitable material. Housing 12 may be arranged in a suitable air ducting system, and includes an inlet 13 and an outlet 14. While unit 10 is not limited to any particular size, it has been found that better air circulation is achieved by mounting several smaller units throughout the room to be purified rather than using one large unit. Thus, while FIGURE 2 illustrates a system utilizing four purifying units, this number is illustrative only and is not a limitation on the invention.

Housing 12 has mounted near the inlet thereof, in a plane inclined to the vertical, extending between the upper and lower casings of the housing, a filter element 20 preferably in the form of a metal screen, removably supported by brackets 21, 22 and 23, 24. The filter screen may be formed of stainless steel or other suitable material.

Exhaust fan 16 is mounted within housing 12 on the outlet side of screen 20, drawing the contaminated air through inlet 13, past filter element 20, and exhausting the purified air out of housing 12 through outlet 14. As will be more fully explained hereinbelow, there is optionally provided a heater unit 18 removably mounted within housing 12 for heating the purified air.

A fluid supply conduit 25 leads from separation tank 40, more fully described hereinbelow, and has at least one branch 26 which extends into air purification unit 10 through housing 12. Nozzles 27 are mounted on branch pipe 26 near the terminus thereof in a manner whereby a spray of the air purifying solution may be directed substantially normally to filter element 20, evenly distributing the solution over the surface of the screen.

Drains 29, 30 are provided in the lower casing of housing 12 on either side of filter 20. As herein preferably embodied, the inlet side of housing 12 forms one wall of drain 29 and extends above the lower casing before terminating at inlet 13. This construction prevents spill-over of the purifying solution from inlet 13 into the room being purified. The air purifying solution, upon being sprayed onto the filter screen, drains over the screen where it contacts and entrains foreign particles from the air stream drawn through inlet 13 by fan 16. Upon draining off the screen, the solution and entrained particles therein pass into the drains, through conduit 31, to return line 32 and separation tank 40.

Separation tank 40 may be of any conventional type, and is herein illustratively embodied as having a weir 41 dividing the tank into a separation chamber and an overflow chamber. The separation chamber includes a return line inlet 42 and sewage drain outlet 43 and the overflow chamber is provided with water make-up inlet 44, chemical make-up inlet 45, and outlet 47. A quantity of purifying solution is made-up in the overflow chamber by passing the desired portions of chemical and water through inlets 44, 45. The desired solution leaves tank 40 at outlet 47 where it is pumped by pump 48 to supply conduit 25.

In operation, a suitable liquid air purifying solution according to my invention is initially made-up in the overflow chamber of separation tank 40, whereupon pump 48 and exhaust fan 16 are set into operation. Pump 48 conducts the solution through supply line 25 and branch line 26 to nozzles 27 where it is sprayed onto filter 20, flooding and continuously wetting the surface thereof. Exhaust fan 16 draws contaminated air from a printing room or the like through inlet 13 and onto filter 20 where it contacts the purifying solution. As the air passes through the filter, the solution scrubs the air, removing ink, lint and other foreign particles therefrom.

The purified air is then either exhausted to the atmosphere or recycled to the printing room. The solution carrying the particles scrubbed from the air drains into conduits 31, 32 where it is returned to separation tank 40. In tank 40, the ink and lint settle out of the purifying solution and are discharged to a sewer system through outlet 43. The decontaminated solution passes over weir 41 and may again be recycled to the filter area. Additional amounts of water and chemical may be added as needed.

The use of heater unit 18 is optional. Since the air is cooled upon contacting the aqueous purifying solution, if it is desired to recycle the purified air to the printing room, it may be necessary to heat the air in a cold climate. Of course, in a warm climate, the purified air could be additionally cooled by passing cold water, rather than steam, through the coils of the heater.

Prior devices for eliminating floc build-up in printing rooms have tended to dry the air in the room thereby increasing static electricity on the surface of the printing paper. It has been found in the air purifying means of the present invention that, in addition to purifying the air, static electricity is reduced to a sufficient degree to eliminate paper sagging and the "dancing" effect between rollers. By controlling the humidity in the printing room at between approximately 45–50% relative humidity, paper sagging and "dancing" is eliminated. The aqueous solution of the invention operates to increase the humidity to the desired percentage. To maintain the desired humidity, part or all of the purified air may be exhausted to the atmosphere by mounting a bypassing damper in the ducting system and connecting it to a humidistat set at the desired humidity level, all in a conventional manner which will be apparent to those skilled in the art.

The invention in its broader aspects is not limited to the methods and compositions described but departures may be made therefrom within the scope of the accompanying claims without departing from the principles of the invention and without sacrificing its chief advantages.

What is claimed:

1. A method for removing foreign particles comprising ink and lint from air which comprises directing said air through a filter element, entrapping said particles comprising ink, and lint in said element, continuously wetting said filter element with an aqueous solution comprising a small effective amount but less than about 1.0 percent by weight of a water soluble non-ionic wetting agent, said wetting agent having the structural formula

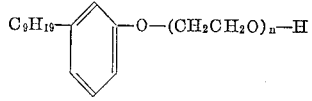

wherein $n$ is an integer between 8 and 15, said continuous wetting removing the entrapped foreign particles comprising ink and lint from said filter element.

2. The process of claim 1 wherein said air is from a printing press room and said aqueous solution contains about 0.005 to about 0.25 percent by weight of said wetting agent.

3. The process of claim 2 wherein the relative humidity in said printing room is controlled between about 45 and 50% by controlling the amount of purified air that is recycled to the printing room.

4. The process of claim 2 wherein said foreign particles comprise floc, which floc contains both ink and lint.

5. A method for removing foreign particles comprising ink and lint from air which comprises directing said air through a filter element which removes said foreign particles comprising ink and lint and continuously wetting the filter element with an aqueous solution comprising a small effective amount, but less than about 1.0 percent by weight, of a water soluble non-ionic polyoxyalkylene wetting agent which removes said foreign particles comprising ink and lint from said filter element.

6. The process of claim 5 wherein said foreign particles comprise floc, which floc contains both ink and lint.

7. A method for removing foreign particles comprising ink and lint from air which comprises directing said air through a filter element which removes said foreign particles comprising ink and lint and continuously wetting the filter element with an aqueous solution comprising a small effective amount, but less than about 1.0 percent by weight, of a water soluble non-ionic wetting agent corresponding to the formula $$R—(CHR'—CHR'—O—)_nH$$

wherein R represents the residue of an alkyl phenol in which the total number of carbon atoms is between 7 and 24, R' represents hydrogen or lower alkyl, and $n$ is an integer of from 2 to 100.

8. A method for removing foreign particles comprising ink and lint from air which comprises directing said air through a filter element which removes said foreign particles comprising ink and lint from said air and continuously wetting the filter element with an aqueous solution comprising a small effective amount of about 0.005 to about 1% by weight of a water soluble non-ionic wetting agent corresponding to the formula $$R—(CHR'—CHR'—O—)_nH$$

wherein R represents the residue of an alkyl phenol in which the total number of carbon atoms is between 7 and 24, R' is a member selected from the group consisting of hydrogen and lower alkyl, and $n$ is an integer of from 4 to 30, which wetting agent removes said foreign particles comprising ink and lint from said filter element.

9. The process of claim 8 wherein said air is from a printing press room and said aqueous solution contains between about 0.005 to about 0.25 percent by weight of said wetting agent.

10. The process of claim 9 wherein the relative humidity in said printing room is controlled between about 45 and 50% by controlling the amount of purified air that is recycled to the printing room.

11. A method for removing foreign particles comprising ink and lint from air which comprises directing said air through a filter element, entrapping said foreign particles comprising ink and lint in said element, continuously wetting said filter element with an aqueous solution comprising a small effective amount of between 0.005 and about 1.0 percent by weight of a water soluble non-ionic wetting agent, said wetting agent consisting essentially of an ethylene oxide adduct of dodecyl phenol having between about 8 and 15 ethylene oxide groups per molecule.

12. The process of claim 11 wherein said air is from a printing press room and said aqueous solution contains about 0.005 to about 0.25 percent by weight of said wetting agent.

13. The process of claim 12 wherein the relative humidity in said printing room is controlled between about 45 and 50% by controlling the amount of purified air that is recycled to the printing room.

14. The process of claim 12 wherein said foreign particles comprise floc, which floc contains both ink and lint.

References Cited

UNITED STATES PATENTS

| | | | |
|---|---|---|---|
| 2,108,248 | 2/1938 | Bichowsky | 55—89 |
| 2,147,248 | 2/1939 | Fleisher | 55—90 X |
| 2,513,174 | 6/1950 | Hess | 55—90 |
| 2,585,659 | 2/1952 | Kilpatrick | 55—94 X |
| 2,596,093 | 5/1952 | De Benneville | 260—611 |
| 2,601,519 | 6/1952 | Hardy et al. | 55—233 X |
| 2,877,866 | 3/1959 | Mathis et al. | 55—85 |
| 3,142,548 | 7/1964 | Krantz | 55—97 |
| 3,155,470 | 11/1964 | Gotte et al. | 55—97 |

REUBEN FRIEDMAN, *Primary Examiner.*

J. ADEE, *Assistant Examiner.*